United States Patent [19]

Sharaby

[11] Patent Number: 4,918,151

[45] Date of Patent: Apr. 17, 1990

[54] AQUEOUS SUSPENSION PROCESS FOR PRODUCING LOW MOLECULAR WEIGHT VINYL COPOLYMERS

[75] Inventor: Zaev Sharaby, Cleveland Heights, Ohio

[73] Assignee: The B. F. Goodrich Company, Akron, Ohio

[21] Appl. No.: 854,203

[22] Filed: Apr. 21, 1986

Related U.S. Application Data

[63] Continuation-in-part of Ser. No. 660,180, Oct. 12, 1984, abandoned.

[51] Int. Cl.$^4$ ................................................. C08F 2/20
[52] U.S. Cl. .................................... 526/211; 526/214; 526/224
[58] Field of Search .................... 526/211, 214, 224

[56] References Cited

U.S. PATENT DOCUMENTS

| | | | |
|---|---|---|---|
| 1,950,438 | 3/1934 | Carothers et al. | 522/185 |
| 3,627,820 | 12/1971 | Chujo | 560/205 |
| 3,696,083 | 10/1972 | Hwa | 526/289 |
| 3,706,722 | 12/1972 | Nelson et al. | 526/216 |
| 3,842,056 | 12/1974 | Torigoe et al. | 526/216 |
| 4,013,824 | 3/1977 | Uraneck et al. | 526/205 |
| 4,189,552 | 2/1980 | Kuwata et al. | 526/84 |
| 4,370,252 | 1/1983 | Uraneck et al. | 526/224 |

*Primary Examiner*—Christopher Henderson
*Attorney, Agent, or Firm*—Joe A. Powell

[57] ABSTRACT

Copolymers of vinyl or vinylidene halides and vinyl esters of fatty acids having low molecular weights, good particle characteristics, and improved melt flow are made by aqueous polymerization utilizing an effective amount of a mercaptan as a chain transfer agent, wherein the chain transfer agent is admixed with the vinyl ester to form a chain transfer composition, and the composition be added before the start of the polymerization.

9 Claims, No Drawings

AQUEOUS SUSPENSION PROCESS FOR PRODUCING LOW MOLECULAR WEIGHT VINYL COPOLYMERS

CROSS REFERENCES TO RELATED APPLICATIONS

This application is a continuation-in-part of application Ser. No. 06/660,180, filed on Oct. 12, 1984, now abandoned.

Applications Ser. Nos. 06/854,204 filed Apr. 21, 1986 and 06/902,714 filed Sept. 2, 1986 now U.S. Pat. No. 4,797,458 in the name of Zaev Sharaby.

BACKGROUND OF THE INVENTION

Much work has been done to make internally plasticized and internally stabilized polyvinyl chloride (PVC) by employing copolymerizable lubricants and stabilizers. Copolymers of vinyl halides such as vinyl chloride and vinyl stearate were extensively studied with the aim of making internally plasticized PVC via the incorporation of vinyl stearate at levels of about 10 to 50% by weight. Vinyl chloride/vinyl stearate copolymers with very low levels of vinyl stearate were not reported and were of no commercial interest, because at such low levels of vinyl stearate the copolymers' mechanical properties were thought to be not much different than those of the PVC homopolymer.

Copolymers of vinyl chloride with vinyl stearate are well established in the literature. The mechanical properties of suspension copolymers of vinyl chloride with vinyl esters of long chain fatty acids, such as vinyl stearate, are discussed by W. S. Port, E. F. Jordan, Jr., W. E. Palm, L. P. Witnauer, J. E. Hansen and D. Swern; *Industrial and Engineering Chemistry*, Vol. 47, pp. 472–480 (1955). Homopolymers, copolymers and terpolymers of allyl stearate/vinyl stearate/vinyl chloride are discussed by E. F. Jordan, Jr., G. R. Riser, B. Artymshyn, S. Smith, Jr., and A. N. Wrigley; *Journal of Polymer Science:* Polymer Chemistry Edition, Vol. 11, pp. 1475–1504 (1973). U.S. Pat. No. 2,993,034 discloses copolymers of vinyl chloride and vinyl epoxy stearate.

The demand for specialty polyvinyl chloride resin for use in custom injection molding (CIM) applications initiated research for PVC resins having high melt flow and low molecular weight, without any corresponding adverse effects on heat stability, heat distortion and related properties. The use of low levels of vinyl esters of fatty acids as a copolymer for PVC substantially improves the melt flow properties, but there is a further need to reduce the molecular weight of the polymer. The molecular weight reduction is accomplished through the practice of this invention by the use of a mercapto compound as a chain transfer agent.

One of the most efficient chain transfer agents in the family of mercaptans is 2-mercaptoethanol. It is more effective than other conventional chlorinated chain transfer agents, such as trichloroethylene U.S. Pat. No. 4,189,552, which is herein incorporated by reference, discloses the use of 2-mercaptoethanol in the suspension polymerization of vinyl chloride with 2-mercaptoethanol levels of 0.001 to 0.50 part per 100 parts of monomer. The '552 patent teaches that the introduction of the mercapto compounds into the reaction medium at a time when the monomer conversion is lower than 1% produces adverse effects on particle characteristics. Because of the detrimental effects that mercapto compounds have on colloidal stability, the '552 patent instructs that the mercapto compounds should be introduced by divided addition during the polymerization. In essence, 2-mercaptoethanol at levels greater than 0.03 part per 100 parts monomer, charged before the onset of the polymerization, is likely to cause an unacceptable coarse or solid charge.

It is a desirable goal to be able to use highly efficient mercaptan chain transfer agents, such as 2-mercaptoethanol, at high levels and without resorting to step wise addition while maintaining the colloidal stability of an aqueous polymerization reaction.

SUMMARY OF THE INVENTION

This invention relates to a process for the production of copolymers of vinyl or vinylidene halides and vinyl esters of fatty acids. The copolymers produced have low molecular weights, improved melt flow, and good particle characteristics. The process comprises the aqueous copolymerization of vinyl or vinylidene halide monomer(s) with up to about 20 parts by weight of vinyl esters of fatty acids per 100 parts by weight of vinyl or vinylidene halide monomer(s), and utilizing from about 0.03 to about 5.00 parts by weight of a water soluble mercaptan or a non-water soluble mercaptan per 100 parts monomer as a chain transfer agent Excellent colloidal stability is obtained when the mercaptan is admixed with the vinyl ester, and even when greater than 0.25 part of mercaptan is charged to the reaction medium prior to the start of polymerization. The use of the mercaptan in conjunction with vinyl esters of fatty acids enables the production of low molecular weight copolymers by the suspension process having an inherent solution viscosity of about 0.10 to about 0.55, and an average particle size of about 80 to about 400 microns.

This invention also provides novel chain transfer compositions comprising (a) at least one mercaptan chain transfer agent and (b) at least one material which is miscible with said mercaptan and which is capable of being copolymerized with vinyl chloride monomer. The novel chain transfer composition offers improved colloidal stability in aqueous polymerization reactions.

DETAILED DESCRIPTION OF THE INVENTION

The process of this invention will be described for a suspension polymerization of vinyl chloride and vinyl ester, but of course is not limited to such and can be easily extended to other materials and to other aqueous processes such as emulsion and microsuspension, by those skilled in the art.

In the practice of this invention, relatively low molecular weight copolymers of vinyl or vinylidene halides and vinyl esters of fatty acids are prepared by aqueous polymerization utilizing a water soluble mercaptan or a non-water soluble mercaptan as a chain transfer agent. While the present invention is specifically illustrated hereinafter with regard to the suspension polymerization of vinyl chloride, it is to be understood that the process may likewise be applied to the aqueous suspension, microsuspension or emulsion polymerization of any polymerizable vinyl or vinylidene halides, such as vinyl bromide, vinylidene chloride, and any other vinylidene halides having at least one terminal $CH_2C<$ group. The vinyl halides and vinylidene halides may be copolymerized with each other or with up to 50% of one or more other copolymerizable monomers. Examples of such copolymerizable monomers are the α,β-olefinically unsaturated carboxylic acids, such as acrylic acid, methacrylic acid, ethacrylic acid, α-cyanoacrylic acid, and the like; maleic and fumaric acid and ester thereof; esters of acrylic acid, such as methyl acrylate, ethyl acrylate, butyl acrylate, octyl acrylate, cyanoethyl acrylate, and the like; esters of methacrylic acid; nitriles such as acrylonitrile and methacrylonitrile; acrylamides such as methyl acrylamide, N-methylol acrylamide, N-butoxy methacrylamide, and the like; vinyl ethers such as ethylvinyl ether, chloroethyl vinyl ether, and the like; the vinyl ketones, styrene and styrene derivatives, including α-methyl styrene, vinyl naphthalene, allyl and vinyl chloroacetate, vinyl acetate, vinyl pyridine, methyl vinyl ketone; olefins such as ethylene and propylene; and other copolymerizable monomers of the types known to those skilled in the art.

The term copolymers as used herein includes polymers of vinyl or vinylidene halides copolymerized with vinyl esters and with or without other copolymerizable monomers being present. For example, what is normally thought of as terpolymers are included within the definition of copolymers.

It has been surprisingly discovered that the copolymerization of vinyl chloride and vinyl esters of fatty acids can be carried out with as much as 5.00 parts of a water soluble mercaptan per 100 parts monomer without loss of colloidal stability. The vinyl esters serve as a host material for the mercaptans. The use of vinyl esters of fatty acids eliminates the adverse effects of the mercaptans via a proposed encapsulation effect when the mercaptans are premixed with the vinyl esters.

The present invention relates to a method for the aqueous copolymerization of vinyl halides with up to about 20 parts by weight per 100 parts by weight of vinyl halide of vinyl esters of fatty acids. The polymerization is carried out using a mercaptan as a chain transfer agent, wherein the mercaptan is admixed with the vinyl ester, and amounts greater than 0.25 part of mercaptan may be charged to the reaction vessel prior to the start of polymerization. This novel process yields a copolymer having low molecular weight, improved melt flow properties and good particle characteristics. The polymer product finds particular utility in custom injection molding applications.

The primary objective of this invention is to produce vinyl halides/vinyl esters of fatty acid copolymers having a low molecular weight, improved melt flow, and good particle size and particle size distribution. The copolymers of the present invention ideally have an average particle size of about 80 to about 400 microns, preferably from 80 to 150 microns if made by the suspension process. The average particle size of the vinyl resins can be measured by a Sonic Sifter Screen Method following ASTM Procedure No. D-1921-63. The copolymers of this invention have an inherent solution viscosity in the range of about 0.25 to about 0.55. The inherent viscosity represents a measure of the polymeric molecular weight and may be tested following ASTM Procedure No. D-1243.

The process of this invention involves the copolymerization of vinyl or vinylidene halides with up to about 20 parts by weight of vinyl esters of fatty acids per 100 parts by weight of vinyl or vinylidene halide Preferably, from about 1 to about 10 parts by weight of vinyl esters of fatty acids per 100 parts by weight of vinyl or vinylidene halide monomers are used. The maximum level of vinyl esters of fatty acids that is suitable in this invention will vary depending on polymerization temperature. Higher amounts may be used as polymerization temperatures are reduced. Polymerization temperature and methods to control them are well known in the art. Suitable vinyl esters are those made from fatty acids, said acids having from 4 to 26 carbons, preferably from 12 to 16 carbons in the chain. Examples of suitable vinyl esters are vinyl laurate, vinyl nononoate, vinyl pivalate, vinyl crotanate, allyl crotanate and vinyl stearate. The most preferable vinyl ester for use in this invention is vinyl stearate. Except for the use of vinyl esters as a comonomer and the use of a mercaptan as a chain transfer agent, the polymerization is much the same as in the conventional polymerization of vinyl chloride in an aqueous medium.

Suitable dispersing agents or suspending agents, such as known in the art, may be used. Examples of suitable dispersants are partially hydrolyzed polyvinyl alcohol, cellulose ethers, starch, gelatin, and the like. The level of dispersant used will be less than about 2.0 parts by weight, preferably less than about 0.5 part by weight per 100 parts by weight of monomer. Excellent results are obtained with from 0.05 to 0.3 part by weight of dispersant per 100 parts by weight of monomer.

The process of this invention uses polymerization initiators. The polymerization initiators used in this process are known in the art and are selected from the conventional free radical initiators such as organic peroxides and azo compounds. The particular free radical initiator employed will depend upon the monomeric material(s) being polymerized, the molecular weight and color requirements of the polymer, the temperature of polymerization, and the type of process such as suspension or emulsion process, etc. Insofar as the amount of initiator employed is concerned, it has been found that an amount in the range of about 0.005 part by weight to abut 1.00 part by weight, based on 100 parts by weight of the monomer or monomers being polymerized, is satisfactory. However, it is preferred to employ an amount of initiator in the range of about 0.01 part by weight to abut 0.20 part by weight based on 100 parts by weight of monomer(s). For the process as described herein, examples of suitable initiators include lauroyl peroxide, azobisisobutylonitrile, benzoyl peroxide, isopropyldicarbonate, acetyl cyclohexyl sulfonyl peroxide, t-butyl peroxypivalate, t-butyl peroxyactoate, and α-cumyl peroxyneodecanoate, the choice depending on the reaction temperature. The preferred initiator is a dual system comprising t-butyl peroxypivalate and α-cumyl peroxyneodecanate. This initiator system results in a reduced residual initiator level in the final product and a shorter high temperature history due to faster reactions.

The suspension polymerization process of this invention may be carried out at any temperature which is normal for the monomeric material to be polymerized. Preferably, a temperature in the range of about 25° C. to about 100° C., more preferably from about 55° C. to about 80° C., is employed. In order to facilitate temperature control during the polymerization process, the reaction medium is kept in contact with cooling surfaces cooled by water, brine, evaporation, etc. This is accomplished by employing a jacketed polymerization reactor wherein the cooling material is circulated through the jacket throughout the polymerization reaction. This cooling is necessary since most all of the polymerization reactions are exothermic in nature. It is understood, of course, that a heating medium can be circulated through the jacket, if necessary.

Two factors are important in producing a high melt flow material for custom injection molding applications; the molecular weight and the chemical nature of the polymer backbone. The presence of a water soluble mercaptan or a non-water soluble mercaptan as a chain transfer agent controls the molecular weight. The vinyl ester comonomer affects the microstructure of the polymer by modifying the chemical nature of the polymer backbone, and thus reducing crystallinity and tacticity. Suitable mercaptans for the practice of this invention include water soluble mercaptans such as 2-mercaptoethanol, 3-mercaptopropanol, thiopropyleneglycol, thioglycerine, thioglycolic acid, thiohydracrylic acid, thiolactic acid and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, and the like. The preferred mercaptan for use in the present invention is 2-mercaptoethanol. The level of mercaptan used is greater than 0.03 part by weight per 100 parts by weight of vinyl monomer. The preferred levels of mercaptan for the practice of the present invention range from about 0.03 to about 5.00 parts by weight per 100 parts monomer, and preferably from 0.20 to 1.50 parts.

When high amounts of mercaptan such as 2-mercaptoethanol are used, it is desirable to not charge the entire amount of chain transfer agent at the beginning of polymerization. 2-mercaptoethanol has a diminishing effect on molecular weight above about the 1.5 parts level. Therefore if, for example, 3.0 parts were used it would be advisable to add only up to 1.5 parts at the beginning of polymerization and to gradually add the remainder during polymerization. With this invention, amounts added at the beginning which are greater than 1.5 parts do not result in colloidal instability. However, for the most efficient use of chain transfer agent, it is preferred to not add more than 1.5 parts before the beginning of polymerization This preferred initial level could of course be different for different mercaptans. The above described preferred procedure is for 2-mercaptoethanol.

Because of the detrimental effects that mercaptans, such as 2-mercaptoethanol, have on colloidal stability, it is necessary to admix the 2-mercaptoethanol with the vinyl ester before adding it to the reaction medium. The vinyl ester serves as a host material for the chain transfer agent. This procedure surprisingly eliminates the adverse effects of 2-mercaptoethanol on colloidal stability. It is believed that the vinyl ester averts the adverse effect of 2-mercaptoethanol on colloidal stability via encapsulation, complexation or interaction, and, thus, allows relatively high levels of 2-mercaptoethanol to be introduced to the reaction medium prior to the start of polymerization. The term "encapsulation" as used in this invention is not intended as the traditional meaning of encapsulation which is to coat or contain and the result is a heterogenous system. The system of this invention is homogenous. This method produces white copolymers which have low molecular weights and a minimum of undesirable coarse particles.

The chain transfer agent may be mixed with all of the vinyl ester that is to be used in the polymerization or with only a portion of the vinyl ester. The preferred method is to mix the entire amount of vinyl ester with the chain transfer agent. At least enough vinyl ester must be used in the mixture to encapsulate or serve as the host for the chain transfer agent. This amount varies according to the type and amount of chain transfer agent used. Usually, the mixture must contain at least an equal amount in weight of vinyl ester as chain transfer agent in order to encapsulate or host the chain transfer agent. Preferably the mixture contains at least twice as much weight of vinyl ester as chain transfer agent.

If less than 0.25 part by weight of chain transfer agent is used, then all of the chain transfer agent will be added as a mixture with vinyl ester before the beginning of polymerization. If more than 0.25 part is used then at least 0.25 part will be added as a mixture with vinyl ester before the beginning of polymerization and the remainder may be added later. To gain the most efficiency of the chain transfer agent, no more than 1.5 part by weight should be added before the start of polymerization. For best results, at least 50% of the chain transfer agent, preferably 100%, is added to the polymerization medium prior to the start of polymerization. Any amount not added at the start and not encapsulated should be added after the polymerization has reached about 10% conversion to maintain colloidal stability.

The vinyl ester and chain transfer agent are preferably mixed together outside of the reactor but, of course, could be charged to the reactor separately and mixed inside the reactor prior to charging the water and vinyl chloride.

When additional copolymerizable monomers are present in addition to the vinyl halide and vinyl ester, that is when making terpolymers, the chain transfer agent should be mixed with the vinyl ester. Mixing the mercaptans with non miscible monomers such as olefinic hydrocarbons, for example ethylene or propylene, should be avoided.

The mixture of vinyl ester and mercaptan chain transfer agent mentioned above form a novel chain transfer composition. The chain transfer composition of this invention comprises (a) at least one mercaptan chain transfer agent and (b) at least one material which is miscible with said mercaptan and which is capable of being copolymerized with vinyl chloride monomer. The novel chain transfer composition offers improved colloidal stability in aqueous polymerization reactions.

The level by weight of (b) in the composition should be at least equal to the weight of mercaptan (a). Preferably the level of (b) is at least 2.0 times the level of (a).

Suitable mercaptan chain transfer agents for use in the novel compositions include those mentioned above in this specification but could be any chain transfer agent having a mercapto (—SH group.

In addition to the mercaptan chain transfer agent, the other necessary ingredient of the novel composition is at least one material which is miscible with said mercaptan chain transfer agent and which is capable of being copolymerized with vinyl chloride monomer. Miscibility may be determined by mixing the material with the chain transfer agent and observing if the two separate. If they do not separate, they are miscible. The material should also be capable of being copolymerized with vinyl chloride. The vinyl esters mentioned above in this specification are a preferred example of materials capable of being copolymerized with vinyl chloride. Other vinyl esters may also be used. The choice of material to mix with the mercaptan to form the novel compositions of this invention is not critical as long as it is both miscible with the mercaptan and copolymerizable with vinyl chloride.

To further illustrate the present invention, the following specific examples are given, it being understood that this is merely intended in an illustrative and not a limitative sense. In the examples, all parts and percentages are by weight unless otherwise indicated.

EXAMPLES

In Examples I through XIII, the polymerization was conducted at 70° C. A reactor vessel was used which was equipped with agitation and cooling means. The chain transfer agent (2-mercaptoethanol) was mixed with the vinyl ester to form a chain transfer composition. This chain transfer composition was charged to the reactor prior to the start of polymerization. The charging procedure was to first charge the vinyl ester/chain transfer agent composition followed by charging water and vinyl chloride. Table I shows the results obtained and the polymerization recipes used in Example I through XIII.

TABLE I

|  | EXAMPLES | | | | | | | | | | | | |
| --- | --- | --- | --- | --- | --- | --- | --- | --- | --- | --- | --- | --- | --- |
|  | I | II | III | IV | V | VI | VII | VIII | IX | X | XI | XII | XIII |
| Ingredients |  |  |  |  |  |  |  |  |  |  |  |  |  |
| Vinyl Chloride | 100 | 100 | 100 | 100 | 100 | 100 | 100 | 100 | 100 | 100 | 100 | 100 | 100 |
| Vinyl Stearate | — | 3.7 | 1.25 | 2.5 | 5.0 | 2.5 | 2.5 | 5.0 | 5.0 | 2.5 | 2.5 | — | — |
| Vinyl t-Nonamoate | — | — | — | — | — | — | — | — | — | — | — | 2.5 | — |
| Vinyl Laurate | — | — | — | — | — | — | — | — | — | — | — | — | 2.5 |
| 2-Mercaptoethanol | — | — | 0.20 | 0.20 | 0.20 | 0.30 | 0.03 | 0.03 | 0.50 | 0.75 | 1.50 | 0.5 | 0.5 |
| Hydroxyalkyl Cellulose | 0.10 | 0.10 | 0.08 | 0.08 | 0.08 | 0.08 | 0.08 | 0.08 | 0.08 | 0.15 | 0.15 | 0.15 | 0.15 |
| Polyvinyl Alcohol | 0.10 | 0.10 | 0.08 | 0.08 | 0.08 | 0.08 | 0.08 | 0.08 | 0.08 | 0.10 | 0.10 | 0.10 | 0.10 |
| DM Water (Total) | 185 | 185 | 185 | 185 | 185 | 185 | 185 | 185 | 185 | 186 | 186 | 186 | 186 |
| Initiator | 0.07 | 0.07 | 0.10 | 0.10 | 0.10 | 0.125 | 0.07 | 0.07 | 0.125 | 0.125 | 0.18 | 0.13 | 0.13 |
| Physical Properties |  |  |  |  |  |  |  |  |  |  |  |  |  |
| Inherent Visc. | 0.69 | 0.63 | 0.44 | 0.42 | 0.42 | 0.38 | 0.54 | 0.55 | 0.32 | 0.32 | 0.27 | 0.35 | 0.36 |
| Avg. Particle Size (Microns) | 119 | 108 | 99 | 92 | 79 | 92 | 88 | 77 | 123 | 82 | 74 | 75 | 87 |
| Relative Melt Flow | 1.00 | 1.93 | 2.49 | 1.76 | 4.57 | 3.19 | 1.10 | 1.47 | 17.3 | — | 25.6 | 6.7 | 6.7 |

The results in the above examples indicate consistently low inherent viscosity (low molecular weight) for Examples III-XIII which are encompassed within the scope of the present invention. The present invention also yields copolymers having a good average particle size in the range of about 80 to about 400 microns, and generally having improved melt flow properties.

The copolymers produced by this invention may be compounded with other materials such as stabilizers, lubricants, plasticizers, colorants, fillers, and the like, to form a variety of end use products. The copolymers find particular utility in custom injection molding applications and powder coatings.

I claim:

1. A process for the production of low molecular weight copolymers of vinyl or vinylidene halides and vinyl esters of fatty acids by aqueous polymerization, comprising (a) the use of up to about 20 parts by weight of vinyl esters of fatty acids per 100 parts by weight of vinyl or vinylidene halide monomer, said acids having from about 4 to about 26 carbons in the chain, as a comonomer, and (b) the use of from about 0.03 to about 5.00 parts by weight per 100 parts monomer of a water soluble or insoluble mercaptan as a chain transfer agent, wherein the mercaptan is admixed with said vinyl esters before adding said mercaptan to the polymerization medium, and wherein at least 0.5 parts by weight of said mercaptan is added in the form of a mixture with vinyl ester to the polymerization medium prior to the start of the polymerization reaction, and wherein less than about 2.0 parts by weight of dispersant is present per 100 parts by weight of monomer.

2. A process of claim 1 wherein the copolymers produced have an inherent solution viscosity of about 0.10 to about 0.55.

3. A process of claim 1 wherein at least 1.0 part by weight of said mercaptan in the form of a mixture with said vinyl ester is added to the polymerization medium prior to the start of the polymerization reaction.

4. A process of claim 1 wherein all of the mercaptan in the form of a mixture with vinyl ester is added to the polymerization medium prior to the start of the polymerization reaction.

5. A process of claim 1 wherein less than 0.5 part by weight of said dispersant is present per 100 parts by weight of vinyl or vinylidene monomer.

6. A process of claim 1 wherein the vinyl halide is vinyl chloride.

7. A process of claim I wherein the vinyl ester is selected from the group consisting of vinyl stearate, vinyl laurate and vinyl nononoate.

8. A process of claim 1 wherein the mercaptan is 2-percaptoethanol.

9. A process of claim 1 wherein the polymerization is carried out at a temperature of about [b 55° to 80°.

* * * * *